(12) United States Patent
Sugimori et al.

(10) Patent No.: US 8,801,030 B2
(45) Date of Patent: Aug. 12, 2014

(54) CURTAIN AIRBAG DEVICE AND VEHICLE

(75) Inventors: Sakae Sugimori, Tokyo (JP); Kenji Nakamura, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 13/697,896

(22) PCT Filed: Apr. 1, 2011

(86) PCT No.: PCT/JP2011/058386
§ 371 (c)(1),
(2), (4) Date: Nov. 14, 2012

(87) PCT Pub. No.: WO2011/145398
PCT Pub. Date: Nov. 24, 2011

(65) Prior Publication Data
US 2013/0056965 A1 Mar. 7, 2013

(30) Foreign Application Priority Data
May 18, 2010 (JP) .................................. 2010-114316

(51) Int. Cl.
*B60R 21/213* (2011.01)
*B60R 21/237* (2006.01)
*B60R 21/232* (2011.01)

(52) U.S. Cl.
CPC ............. *B60R 21/213* (2013.01); *B60R 21/237* (2013.01); *B60R 21/232* (2013.01)
USPC ....................................................... 280/730.2

(58) Field of Classification Search
USPC ................. 280/730.2, 749, 740, 742
See application file for complete search history.

(56) References Cited

U.S. PATENT DOCUMENTS

| 6,371,512 B1 | 4/2002 | Asano et al. |
| 6,830,262 B2 | 12/2004 | Sonnenberg et al. |
| 2002/0096864 A1 | 7/2002 | Asano et al. |
| 2006/0131849 A1 | 6/2006 | Ochiai |

FOREIGN PATENT DOCUMENTS

| EP | 0980796 A2 | 2/2000 |
| EP | 1607276 A2 | 12/2005 |
| EP | 1607277 A2 | 12/2005 |

(Continued)

OTHER PUBLICATIONS

Machine Translation of JP 2002-321586.*

(Continued)

*Primary Examiner* — Drew Brown
(74) *Attorney, Agent, or Firm* — Fitch, Even, Tabin & Flannery, LLP

(57) ABSTRACT

In one form, a curtain airbag device is provided having a gas introduction portion that is folded so as to be disposed on a side surface of a folded body of a curtain airbag main body on a roof side portion side. When the vehicle is involved in a side collision or an overturn, an inflator discharges a gas, which is supplied to a curtain airbag, thereby causing the curtain airbag to start to be inflated. In this case, the gas from the inflator initially flows into the gas introduction portion so as to inflate the gas introduction portion. Thus, the inflating force of the folded body of the curtain airbag main body and the inflating pressure of the gas introduction portion are superposed each other so as to press a lower edge of a roof side garnish toward the inside of the vehicle cabin.

8 Claims, 8 Drawing Sheets

(56) References Cited

FOREIGN PATENT DOCUMENTS

| | | | |
|---|---|---|---|
| EP | 1674349 | A1 | 6/2006 |
| JP | 2000-52907 | A | 2/2000 |
| JP | 2002-321586 | A | 11/2002 |
| JP | 2006-175920 | A | 7/2006 |
| JP | 2007-069721 | A | 3/2007 |
| JP | 4051259 | B2 | 12/2007 |
| JP | 2008-260425 | A | 10/2008 |

OTHER PUBLICATIONS

International Search Report for International Application No. PCT/JP2011/058386 dated May 31, 2011 (2 pages) and an English translation of the same (2 pages).

* cited by examiner

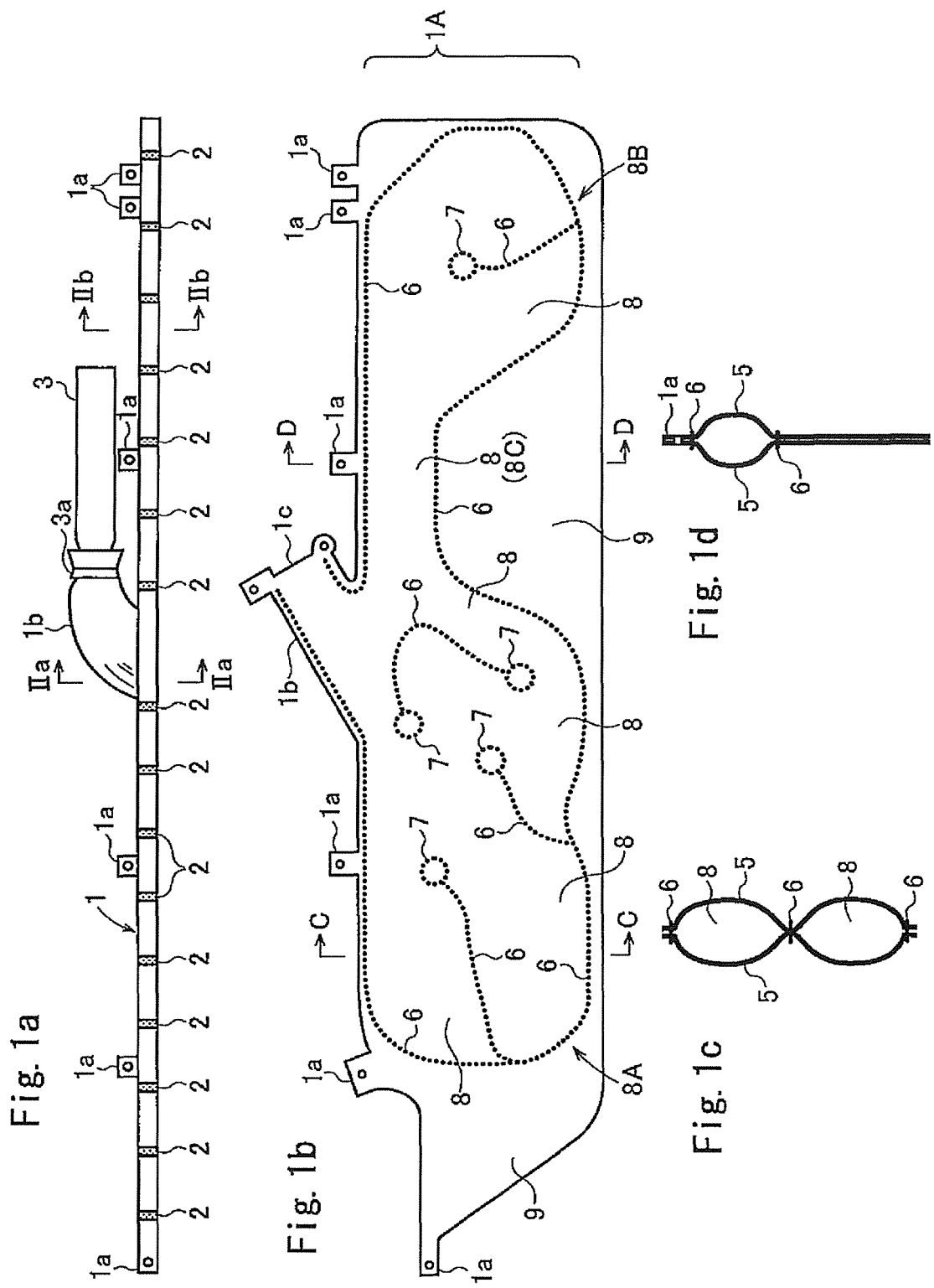

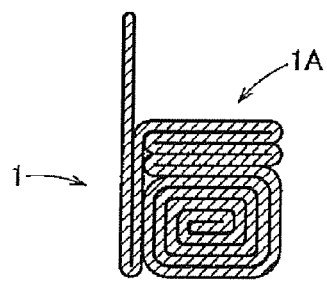 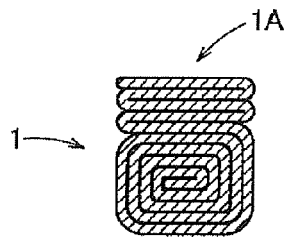
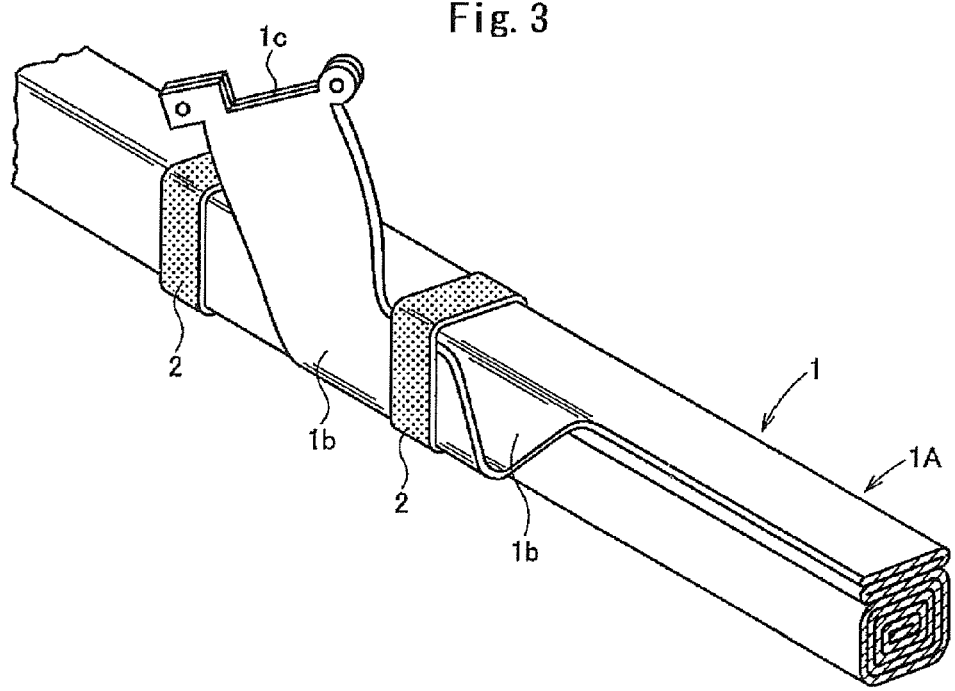

CURTAIN AIRBAG DEVICE AND VEHICLE

CROSS-REFERENCE TO A RELATED APPLICATIONS

This application is a U.S. national phase application filed under 35 U.S.C. §371 of International Application PCT/JP2011/058386, filed on Apr. 1, 2011, designating the United States, which claims priority from Japanese Application 2010-114316, filed on May 18, 2010, which are hereby incorporated herein by reference in their entirety.

TECHNICAL FIELD

The present invention relates to a curtain airbag device having a curtain airbag to be inflated and deployed along side door windows and the like when an automobile is involved in an accident such as a side collision or an overturn and relates to a vehicle equipped with this curtain airbag device. In particular, the present invention relates to the curtain airbag device and the vehicle, in which the curtain airbag extends beyond an upper portion of a pillar garnish so as to be deployed in the vehicle cabin.

BACKGROUND ART

As an airbag that restrains the heads of occupants of an automobile, a curtain airbag is used. The curtain airbag is disposed in a cabin of the automobile near a corner where a ceiling portion and a side surface portion intersect each other and inflated along side door windows and the like by a gas introduced through a gas introduction port.

In an automobile equipped with the curtain airbag device, in the case where the automobile is involved in an accident such as a side collision or an overturn, the curtain airbag is inflated toward a lower side of the vehicle body along a side surface (for example, door or pillar) in the vehicle cabin, thereby restraining the heads of the occupants and, when the window is open, preventing the occupants from being thrown away from the vehicle.

As such a curtain airbag device, a curtain airbag device is known, in which a folded body of the curtain airbag is disposed in a space between a roof side rail and a side edge portion of a roof lining, and a lower edge of the side edge portion of the roof lining is engaged with an upper end of a pillar garnish (Japanese Unexamined Patent Application Publication No. 2007-69721).

In the curtain airbag device disclosed in Japanese Unexamined Patent Application Publication No. 2007-69721, when an inflator operates, a gas is introduced into the curtain airbag through a gas introduction portion provided at an upper edge near a central portion in a front-rear direction of the curtain airbag, thereby inflating and deploying the curtain airbag. The curtain airbag presses and opens the side edge portion of the roof lining toward the inside of the vehicle cabin so as to be inflated and deployed in the vehicle cabin.

Japanese Unexamined Patent Application Publication No. 2007-69721 describes a technology in which, in order to prevent the curtain airbag, which is being inflated and deployed toward the inside of the vehicle cabin, from interfering with an upper end of a pillar garnish, a small bag portion is attached to an upper edge portion of a main body of the curtain airbag so as to be bulged. When the folded body of the curtain airbag is inflated, the small bag portion (referred to as "upper edge side bag portion" in Japanese Unexamined Patent Applicaation Publication No. 2007-69721) is inflated so as to press the curtain airbag main body toward the interior. By doing this, the curtain airbag being inflated and deployed extends beyond the upper end of the pillar garnish so as to move toward the interior, thereby being deployed in the vehicle cabin.

Japanese Unexamined Patent Application Publication No. 2000-52907 describes a technology in which a gas introduction path, through which a gas from an inflator is introduced into inflatable portions of a curtain airbag, extends in the front-rear direction along an upper edge portion of the curtain airbag. When the curtain airbag is folded, a portion of the curtain airbag below the gas introduction path is folded into an elongated folded body in the front-rear direction, and then the gas introduction path is bent so as to be disposed on a surface of the folded body on the exterior side.

With the technology described in Japanese Unexamined Patent Application Publication No. 2000-52907, when the gas is discharged from the inflator, the gas from the inflator initially flows into the gas introduction path so as to inflate the gas introduction path. Thus, the folded body of the portion of the airbag below the gas introduction path is pressed toward the interior by the inflated gas introduction path. As a result, the curtain airbag being inflated and deployed extends beyond an upper end of a pillar garnish so as to move toward the interior, thereby being deployed in the vehicle cabin.

SUMMARY OF INVENTION

According to the technology described in Japanese Unexamined Patent Application Publication No. 2007-69721, a small airbag portion is sewed to the curtain airbag main body. Thus, much work is required for producing the curtain airbag. Furthermore, since the small bag portion is separately produced, the cost is increased.

According to the technology described in the above-described Japanese Unexamined Patent Application Publication No. 2000-52907 the gas introduction path, into which the gas from the inflator is initially introduced, is disposed on the exterior side of the folded body disposed in a portion of the airbag below the gas introduction path. The gas introduction path is initially inflated, thereby pressing the folded body of the curtain airbag toward the interior. Thus, there is no need of the separately prepared small bag portion.

However, the amount of gas flowing in the gas introduction path is determined in accordance with, for example, the amount of gas required to be supplied to the inflatable portions of the curtain airbag. Accordingly, when the amount of gas flowing in the gas introduction path, the diameter of a flow path near a pillar portion, or the like is adjusted in order to adjust, for example, a force pressing the folded body of the curtain airbag toward the interior applied by the inflated gas introduction path or the amount of the movement of the folded body of the curtain airbag toward the interior, the adjustment may affect deployment of the whole curtain airbag (for example, the whole curtain airbag is unlikely to be uniformly inflated). For this reason, with the technology described in Japanese Unexamined Patent Application Publication No. 2000-52907 adjustment of the force pressing the folded body of the curtain airbag toward the interior applied by the inflated gas introduction path or the amount of the movement of the folded body of the curtain airbag toward the interior may be difficult.

Also according to the technology described in Japanese Unexamined Patent Application Publication No. 2000-52907 the gas introduction path is elongated in the front-rear direction along the upper edge portion of the curtain airbag from an inflator connecting port of the curtain airbag to one of the inflatable portions, the one inflatable portion positioned at the most distant position from the inflator connecting port. Accordingly, in order to fold the curtain airbag, the curtain airbag except for the gas introduction path is folded so as to have an elongated shape in the front-rear direction, and then the remaining whole gas introduction path is bent so as to be disposed on the surface of the folded body on the exterior side. This requires fine control of production.

An object of the present invention is to provide a curtain airbag device, in which a curtain airbag being inflated and deployed presses and opens a roof lining toward a vehicle cabin side not only by receiving an inflating force of the curtain airbag main body but also by receiving an urging force due to inflation of a gas introduction portion, so that the curtain airbag is inflated and deployed in a vehicle cabin. In addition, the curtain airbag device allows a force pressing the folded body of the curtain airbag toward the interior applied by the inflated gas introduction portion and the amount of the movement of the folded body of the curtain airbag toward the interior to be easily adjusted, and allows the curtain airbag to be easily folded.

A curtain airbag device according to a first embodiment includes a folded body of a curtain airbag disposed in a space between a vehicle body member and a side edge portion of a roof lining and an inflator that inflates the curtain airbag. The curtain airbag includes a gas introduction portion positioned at a level above a level of a pillar garnish. The gas introduction portion extends upward from a curtain airbag main body. A gas is introduced from the inflator to the curtain airbag main body through the gas introduction portion. In the curtain airbag device, in a state in which the curtain airbag is folded, the gas introduction portion is disposed on a side surface on the vehicle body member side of the folded body of the curtain airbag main body.

In the curtain airbag device according to a second embodiment, the gas introduction portion is bent at a lower portion of the side surface of the folded body of the curtain airbag main body so as to be folded into at least two layers and disposed along the side surface of the curtain airbag main body in the first embodiment.

In the curtain airbag device according to a third embodiment, the folded body of the curtain airbag main body and the gas introduction portion are bound together with a binder in the first or second embodiment.

A vehicle according to a fourth embodiment includes the folded body of the curtain airbag of the curtain airbag device according to any one of the first to third embodiments disposed in a space between a vehicle body member and a side edge portion of a roof lining and the gas introduction portion disposed above a pillar garnish.

In the curtain airbag device and the vehicle according to the present invention, the curtain airbag being inflated and deployed presses and opens the roof lining toward the vehicle cabin side not only by receiving the inflating force of the curtain airbag main body but also with the assistance of the urging force due to inflation of the gas introduction portion, so that the curtain airbag is inflated and deployed in the vehicle cabin.

That is, in the curtain airbag device according to the present invention, when the inflator operates, the gas from the inflator is introduced into the curtain airbag main body through the gas introduction portion. In a state in which the curtain airbag is folded, the gas introduction portion is disposed between the folded body of the curtain airbag main body and the vehicle body member. Accordingly, when the gas introduction portion is inflated, the folded body of the curtain airbag main body is pressed toward the interior and moved. Thus, the inflating force of the curtain airbag main body and the force with which the gas introduction portion presses the curtain airbag main body toward the inside of the vehicle cabin are superposed on each other and act on the side edge portion of the roof lining, thereby pressing and opening the side edge portion of the roof lining toward the inside of the vehicle cabin, so that the curtain airbag is inflated and deployed in the vehicle cabin.

According to the present invention, in order to fold the curtain airbag, the gas introduction portion extending upward from the curtain airbag main body is folded so as to be disposed on an exterior side of the folded body of the curtain airbag main body. Thus, the curtain airbag can be easily folded compared to a case where the gas introduction path, which is elongated in the front-rear direction along the upper edge portion of the curtain airbag main body, is bent so as to be disposed on the exterior side of the folded body of the portion of the airbag below the gas introduction path as described in the aforementioned Patent Literature 2.

According to the present invention, the gas from the inflator flows into the curtain airbag main body through the gas introduction portion, and is supplied to the inflatable portions through the gas introduction path formed in the curtain airbag main body. According to the present invention, the gas introduction portion between the folded body of the curtain airbag main body and the vehicle body member is inflated, thereby pressing the folded body of the curtain airbag main body toward the interior. Thus, by adjusting the amount of gas flowing through the gas introduction portion, or the thickness, length, or the like of the gas introduction portion, the force pressing the folded body of the curtain airbag main body toward the interior applied by the inflated gas introduction portion and the amount of the movement of the folded body of the curtain airbag main body toward the interior can be adjusted. Accordingly, there is no need of adjustment of the amount of gas flowing through the gas introduction path of the curtain airbag main body, the diameter of the flow path near pillar portions, or the like in order to adjust the force pressing the folded body of the curtain airbag main body toward the interior or the amount of the movement of the folded body of the curtain airbag main body toward the interior. Thus, the force pressing the folded body of the curtain airbag main body toward the interior applied by the inflated gas introduction portion and the amount of the movement of the folded body of the curtain airbag main body toward the interior can be easily adjusted without affecting deployment of the whole curtain airbag main body.

In the curtain airbag device according to the second embodiment, the gas introduction portion is folded into two or more layers. Accordingly, when the gas introduction portion is inflated, the force pressing the curtain airbag main body toward the interior is increased.

In the curtain airbag device according to the third embodiment, the shape of the folded body of the curtain airbag main body and the gas introduction portion is maintained with the gas introduction portion folded so as to be disposed on the side surface of the folded body of the curtain airbag main body.

BRIEF DESCRIPTION OF THE DRAWINGS

FIGS. 1a-1b are explanatory views of a curtain airbag device according to an embodiment.

FIGS. 2a-2b are sectional views of the curtain airbag device according to the embodiment.

FIG. 3 is a perspective view of part of the curtain airbag device according to the embodiment.

DETAILED DESCRIPTION OF THE PREFERRED EMBODIMENTS

Figure 4A:
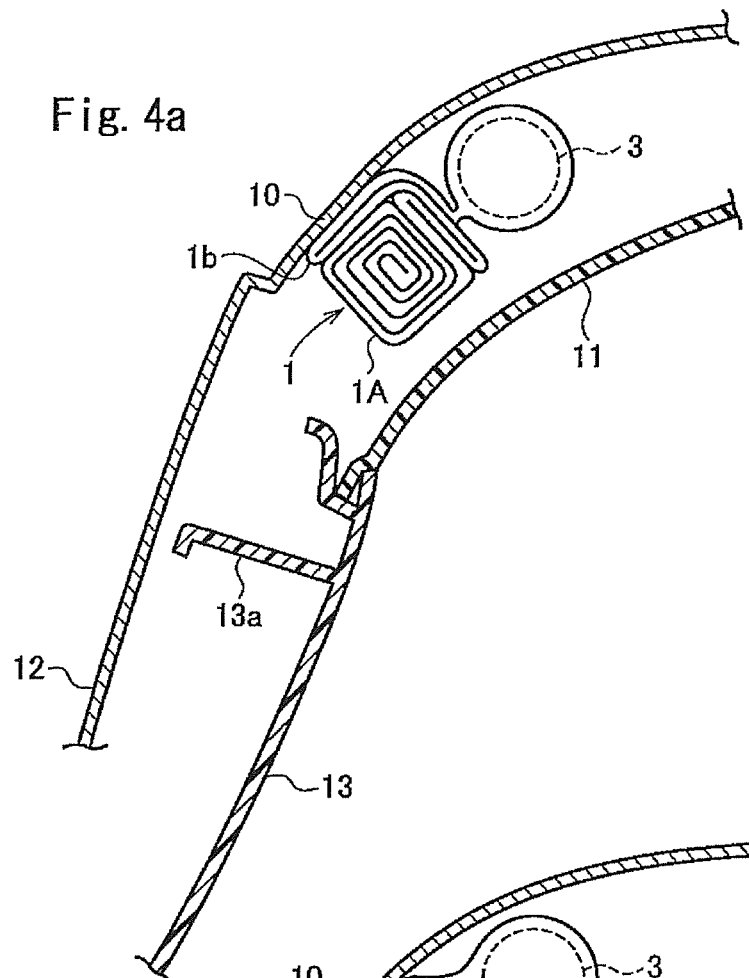
FIGS. 4a-4b are sectional views of a vehicle equipped with the curtain airbag device according to the embodiment.
Figure 4B:
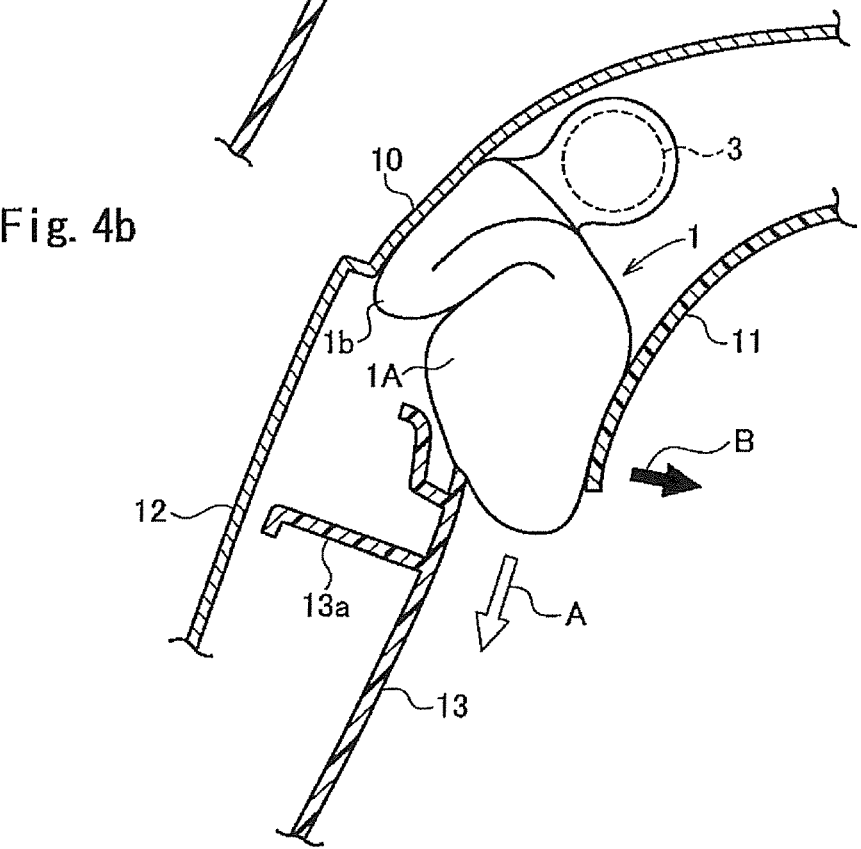
Figure 5:
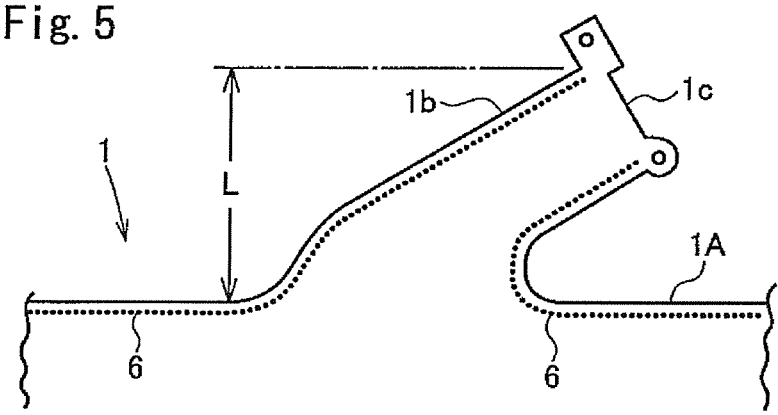
FIG. 5 is a side view of an area near a gas introduction portion of the curtain airbag.
Figure 6:
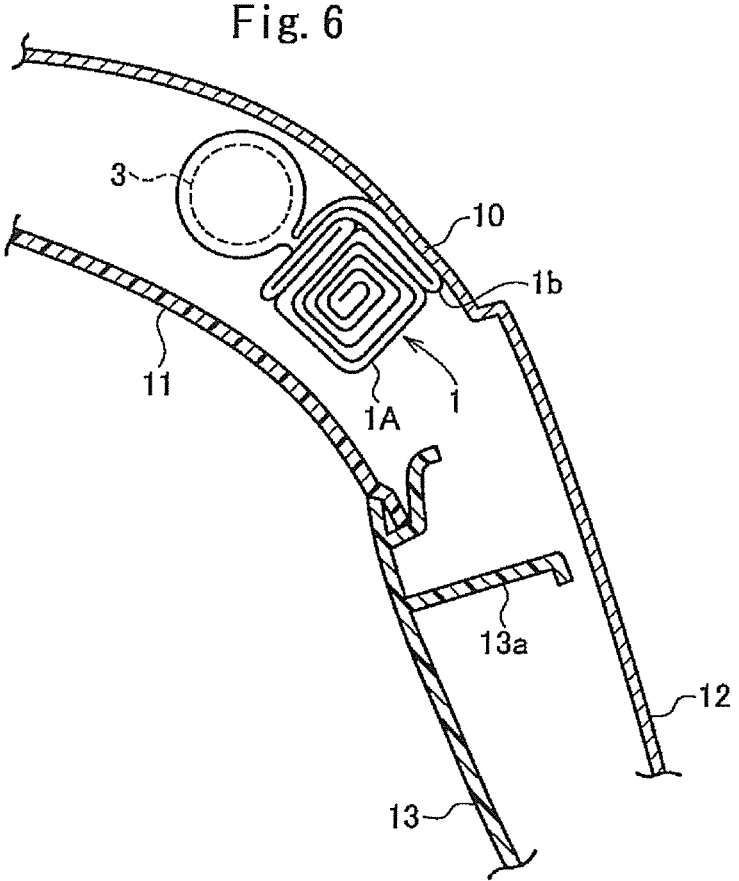
FIG. 6 is a sectional view of the vehicle equipped with the curtain airbag device according to the embodiment.

Embodiments of the present invention will be described below with reference to the drawings. FIGS. 1a, 1b, 1c, and 1d illustrate a curtain airbag device according to one example of the present invention. FIG. 1a is a side view of a folded curtain airbag, FIG. 1b is a side view of the inflated and deployed curtain airbag, and FIGS. 1c and 1d are sectional views of the curtain airbag taken along line C-C and line D-D in FIG. 1b, respectively. FIG. 2a is a sectional view of the curtain airbag taken along line IIa-IIa in FIG. 1a, and FIG. 2b is a sectional view taken along line IIb-IIb in FIG. 1a. FIG. 3 is a perspective view of part of a curtain airbag folded body. FIGS. 4a and 4b are longitudinal sectional views taken in a vehicle width direction illustrating an area near an upper portion of a right side B-pillar of a vehicle equipped with a curtain airbag device. FIG. 4a illustrates the curtain airbag before the curtain airbag is inflated, and FIG. 4b illustrates the curtain airbag having been inflated. In FIGS. 4a and 4b, the folded body of the curtain airbag is disposed along a roof side portion on the right side of the vehicle. FIG. 5 is a side view of an area near a gas introduction portion of the curtain airbag. FIG. 6 is a longitudinal sectional view of an area near a left side B-pillar of the vehicle taken along the vehicle width direction, illustrating an embodiment in which the folded body of the curtain airbag is disposed along the roof side portion on the left side of the vehicle. The front-rear direction, the left-right direction, and the up-down direction hereafter match those of the vehicle in which the curtain airbag device is installed.

In this embodiment, a curtain airbag 1 is folded so as to have an elongated shape in the front-rear direction. The folded curtain airbag 1 is bound with binders 2 so as to maintain the folded shape and disposed along a roof side portion 10 of a vehicle body of an automobile. When the automobile is involved in an accident such as a side collision or an overturn, the curtain airbag 1 starts to be inflated by a gas from an inflator 3 and is inflated and deployed toward a lower side of the vehicle body along a side surface inside a vehicle cabin including doors and pillars. The curtain airbag 1 has ears 1a, with which the curtain airbag 1 is attached to the vehicle body, formed in a front end portion thereof and an upper edge portion thereof. The ears 1a are spaced apart by specified distances and retained at the roof side portion 10 except for the frontmost ear 1a, which is retained at an A-pillar.

A gas introduction portion 1b is disposed in a longitudinally central portion of an upper edge of a main body 1A of the curtain airbag 1. The gas introduction portion 1b has a short cylindrical shape and rearwardly extends in a diagonally upward direction. The gas introduction portion 1b has a gas introduction port 1c at its tip end. An end of the inflator 3 is inserted into the gas introduction port 1c and bound by a belt 3a. The inflator 3 is secured to the roof side portion 10 with a securing member (not shown).

As illustrated in FIG. 4a, a roof side garnish 11 is provided on the vehicle interior side of the roof side portion 10. The roof side garnish 11 covers the folded body of the curtain airbag 1 and the inflator 3.

As illustrated in FIGS. 1b, 1c, and 1d, the curtain airbag 1 is formed by superposing two sheets 5, which have shapes substantially similar to each other, on each other. One of the two sheets 5 defines a surface facing the side surface of the vehicle cabin and the other one of the sheets 5 defines a surface facing the inside of the vehicle cabin. The sheets 5 are connected to each other in linear connected portions 6 and circular connected portions 7, thereby forming an inflatable portion 8 and a non-inflatable portion 9.

Each of the linear connected portions 6 and each of the circular connected portions 7 are formed by connecting the sheets 5 in an airtight manner with a robust connection means (for example, sewing with sewing threads having high strength, bonding with an adhesive having high adhesion force, or welding) such that the sheets 5 are not separated from each other even when an internal pressure of the curtain airbag 1 increases to an upper limit pressure in design.

Some linear connected portions 6 extend along a periphery of the curtain airbag 1, and the other linear connected portions 6 extend so as to define a plurality of small chamber portions in the inflatable portion 8. The circular connected portions 7 are formed at ends of the linear connected portions 6.

In the present embodiment, a front side inflatable portion 8A and a rear side inflatable portion 8B are respectively defined in front and rear portions of the curtain airbag main body 1A with the non-inflatable portion 9 interposed therebetween. A gas introduction path 8C is formed along the upper edge of the curtain airbag main body 1A. The gas introduction path 8C introduces the gas from the inflator 3 to the above-described inflatable portions 8A and 8B. The gas introduction path 8C extends from a position near a front end to a position near a rear end of the upper edge of the curtain airbag main body 1A. A base end (lower end) side of the gas introduction portion 1b communicates with an intermediate portion in the front-rear direction of the gas introduction path 8C.

The curtain airbag 1 is folded so as to have an elongated shape extending in the front-rear direction of the vehicle body. As illustrated in FIGS. 2a and 2b, in the present embodiment, a lower portion of the main body 1A (that is, a portion of the main body 1A except for the gas introduction portion 1b) of the curtain airbag 1 is roll-folded and an upper portion of the main body 1A is pleat-folded. In order to fold the curtain airbag 1, it is preferable that the lower portion of the main body 1A be initially roll-folded, and then the upper portion be pleat-folded so as to be disposed on top of the roll-folded portion.

When the curtain airbag main body 1A is roll-folded, directions in which the curtain airbag main body 1A is roll-folded are preferably opposite to each other between the following cases. That is, in the case where the folded body of the curtain airbag 1 is disposed along the right side surface of the vehicle cabin and in the case where the folded body of the curtain airbag 1 is disposed along the left side surface of the vehicle cabin. In particular, according to the present invention, when the curtain airbag main body 1A is roll-folded, the curtain airbag main body 1A is preferably roll-folded from a lower end side toward an upper end side (to a boundary with the pleat-folded portion) such that the surface of the curtain airbag main body 1A, the surface facing the side surface of the vehicle cabin (surface on the outer side of the vehicle) when deployment is completed, is located near the center of the roll. Specifically, the curtain airbag main body 1A is folded as follows.

In the present embodiment, as illustrated in FIG. 4a, the folded body of the curtain airbag 1 is disposed along the roof side portion 10 on the right side of the vehicle. In this case, when the curtain airbag 1 is folded, the lower portion of the curtain airbag main body 1A is preferably roll-folded clockwise seen from the front side of the vehicle as illustrated in FIGS. 2a, 2b, and 4a. In a state in which the curtain airbag 1 is folded in such a manner, when the curtain airbag 1 is inflated and the roll-folded portion of the curtain airbag main body 1A is deployed in the vehicle cabin, the roll-folded portion is deployed downward while rolling so as to approach the right side surface of the vehicle cabin. Thus, the curtain airbag main body 1A is deployed downward along the side surface of the vehicle cabin without excessively being separated from the nearby side surface of the vehicle cabin. In contrast, in the case where the folded body of the curtain airbag 1 is disposed along the roof side portion 10 on the left side of the vehicle, as illustrated in FIG. 6, the lower portion of the curtain airbag main body 1A is preferably roll-folded counterclockwise seen from the front side of the vehicle. The structure illustrated in FIG. 6 is similar to that illustrated in FIG. 4a except that the left and right are inverted.

After the main body 1A has been folded into the elongated folded body as described above, the gas introduction portion 1b is folded so as to be disposed on a side surface of the folded body on a vehicle body member (roof side portion 10) side. In the present embodiment, as illustrated in FIGS. 2a and 3, the gas introduction portion 1b is bent downward from an upper edge of the folded body of the curtain airbag main body 1A along a side surface of the folded body, is bent back upward near a lower edge of the side surface of the folded body also along the side surface of the folded body, and then extends upward without being bent. Thus, the gas introduction portion 1b is disposed on the side surface of the folded body of the main body 1A while being folded into two layers. By folding the gas introduction portion 1b so as to be disposed on the side surface on the vehicle body member side of the folded body of the main body 1A as described above, during inflation of the curtain airbag 1, when the gas introduction portion 1b is inflated by the gas introduced thereto from the inflator 3, the inflated gas introduction portion 1b presses the folded body of the main body 1A, thereby moving the folded body of the main body 1A toward the inside of the vehicle cabin.

By adjusting a length L (FIG. 5) from the upper edge of the main body 1A to the upper end of the gas introduction portion 1b in the up-down direction, the force pressing the folded body of the main body 1A toward the inside of the vehicle cabin applied by the inflated gas introduction portion 1b (or a movement distance by which the folded body of the main body 1A is moved by being pressed by the inflated gas introduction portion 1b) can be adjusted. For example, the length L of the gas introduction portion 1b in the up-down direction may be increased compared the length illustrated in FIG. 1b so as to allow the gas introduction portion 1b to be folded into a plurality of layers having a more even number of layers such as four layers or six layers, which are more than two layers. By doing this, the inflated gas introduction portion 1b presses the folded body of the main body 1A toward the inside of the vehicle cabin with a larger force, and the amount of the movement of the folded body of the main body 1A toward the inside of the vehicle cabin is increased.

The folded body of the curtain airbag 1 having been folded as described above is bound with binders 2 so as to maintain the folded shape. The degree of strength of the binders 2 is such that the binders 2 become cut or released when the curtain airbag 1 is inflated. The binders 2 are spaced apart from one another at a plurality of positions in the longitudinal direction of the folded body. As illustrated in FIG. 3, the binder 2 is also wrapped around part of the gas introduction portion 1b, thereby maintaining the shape of the folded body of the main body 1A and the gas introduction portion 1b with the folded body of the main body 1A and the gas introduction portion 1b disposed on each other.

The vehicle body in which the above-described curtain airbag device is installed has A-pillars (not shown), B-pillars 12 as center pillars, C-pillars (not shown), the roof side portions 10, and the like. As illustrated in FIGS. 4a and 4b, a B-pillar garnish 13 is attached to the B-pillar 12. A roof side garnish 11, which is part of a roof lining, is provided along a ceiling of the vehicle body. An upper end of the B-pillar garnish 13 is engaged with a lower end of the roof side garnishes 11. A lid-shaped cover 13a, which closes a space between a B-pillar garnish 13 and the B-pillar 12, is provide on a rear side of an upper end portion of the B-pillar garnish 13.

Next, operation of the thus structured curtain airbag device will be described.

When the vehicle is involved in a side collision or an overturn, the inflator 3 discharges a gas, which is supplied to the curtain airbag 1, thereby causing the curtain airbag 1 to start to be inflated. In this case, the gas from the inflator 3 initially flows into the gas introduction portion 1b so as to inflate the gas introduction portion 1b. Thus, the inflating force of the folded body of the curtain airbag main body 1A and the inflating pressure of the gas introduction portion 1b are superposed each other so as to press the lower edge of the roof side garnish 11 toward the inside of the vehicle cabin. The lower edge of the roof side garnish 11 is opened toward the inside of the vehicle cabin as indicated by arrow B in FIG. 4b, and the curtain airbag 1 is inflated and deployed downward along the B-pillar garnish 13 and a side door glass as indicated by an arrow A. It is noted that FIG. 4b schematically illustrates the curtain airbag 1 being deployed, and illustration of folds (a zigzag line illustrating pleat folding and a spiral line illustrating roll folding as illustrated in FIG. 4a) of the curtain airbag main body 1A is omitted.

In the present embodiment, since the gas introduction portion 1b, which is folded into two layers, is disposed on the side surface of the folded body of the main body 1A of the curtain airbag 1, the folded body of the main body 1A is pressed so as to move toward the interior by about twice the thickness of a single layer of the inflated gas introduction portion 1b. Thus, the lower edge of the roof side garnish 11 is largely pressed and opened. After that, the entirety of the inflatable portion 8 of the curtain airbag 1 is inflated. The curtain airbag 1 is inflated and deployed to a position such that the curtain airbag 1 entirely covers the windows of the doors.

The present curtain airbag device has a structure in which, in order to fold the curtain airbag 1, the gas introduction portion 1b extending upward from the curtain airbag main body 1A is folded so as to be disposed on an exterior side of the folded body of the curtain airbag main body 1A. Thus, the curtain airbag 1 can be easily folded compared to a case where the gas introduction path 8C, which is elongated in the front-rear direction along the upper edge portion of the curtain airbag main body 1A, is bent so as to be disposed on the exterior side of the folded body below the gas introduction path 8C as described in the aforementioned Japanese Unexamined Patent Application Publication No. 2000-52907.

In the present curtain airbag device, the gas from the inflator 3 flows into the curtain airbag main body 1A through the gas introduction portion 1b and is supplied to the inflatable portions 8A and 8B through the gas introduction path 8C formed in the curtain airbag main body 1A. In the curtain airbag device, the gas introduction portion 1b between the folded body of the curtain airbag main body 1A and the roof side portion 10 is inflated, thereby pressing the folded body of the curtain airbag main body 1A toward the interior. Thus, by adjusting the amount of gas flowing through the gas introduction portion 1b, or the thickness, length, or the like of the gas introduction portion 1b, the force pressing the folded body of the curtain airbag main body 1A toward the interior applied by the inflated gas introduction portion 1b and the amount of the movement of the folded body of the curtain airbag main body 1A toward the interior can be adjusted. Accordingly, there is no need of adjustment of the amount of gas flowing through the gas introduction path 8C in the curtain airbag main body 1A, the diameter of the flow path near a pillar portion, or the like in order to adjust the force pressing the folded body of the curtain airbag main body 1A toward the interior and the amount of the movement of the folded body of the curtain airbag main body 1A toward the interior. Thus, the force pressing the folded body of the curtain airbag main body 1A toward the interior applied by the inflated gas introduction portion 1b and the amount of the movement of the folded body of the curtain airbag main body 1A toward the interior can be easily adjusted without affecting deployment of the whole curtain airbag 1.

The above-described embodiment is an example of the present invention and the present invention is not limited to this. For example, although the lower portion of the curtain airbag main body 1A is roll-folded and the upper portion of the curtain airbag main body 1A is pleat-folded in the above-described embodiment, the curtain airbag main body 1A may be folded in an alternative manner. However, in the case where the lower portion of the curtain airbag main body 1A is roll-folded and the upper portion of the curtain airbag main body 1A is pleat-folded, when the curtain airbag main body 1A is inflated, the speed at which the curtain airbag main body 1A is deployed is higher in the pleat-folded portion than in the roll-folded portion. Thus, in addition to the fact that the folded body of the curtain airbag main body 1A is pressed so as to move toward the interior by the pressure applied by the gas introduction portion 1b, the curtain airbag main body 1A can be quickly deployed in the vehicle cabin. Furthermore, even in the case where the distance between a position where the folded body of the curtain airbag 1 is disposed and the upper end of the B-pillar garnish 13 is large, by adjusting the length of the upper portion of the curtain airbag main body 1A to be pleat-folded, the roll-folded lower portion of the curtain airbag main body 1A can be moved beyond the upper end of the B-pillar garnish 13 and quickly deployed in the vehicle cabin.

Figure 7A:
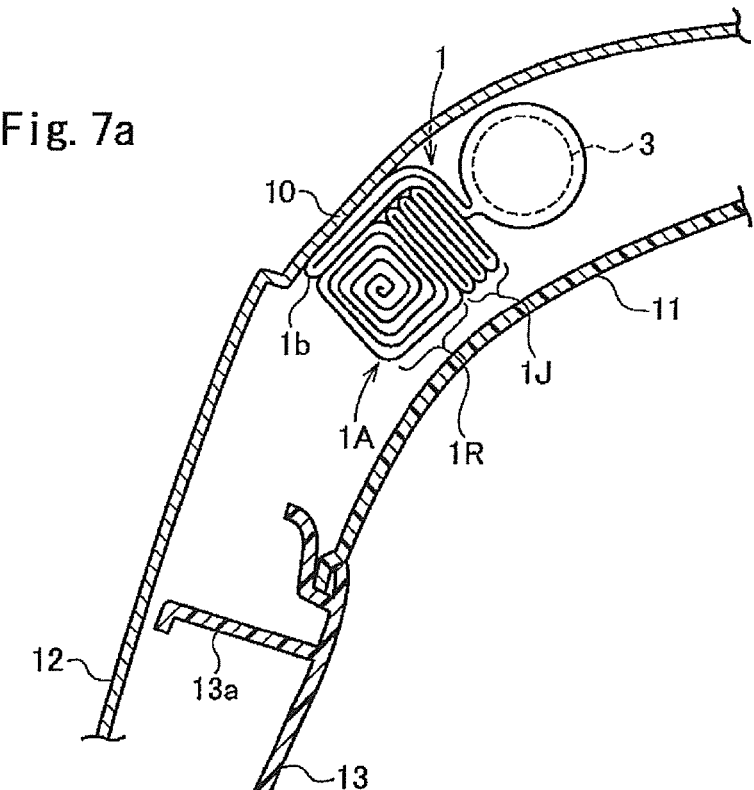
FIGS. 7a-7b are sectional views illustrating operation of the curtain airbag device.
Figure 7B:
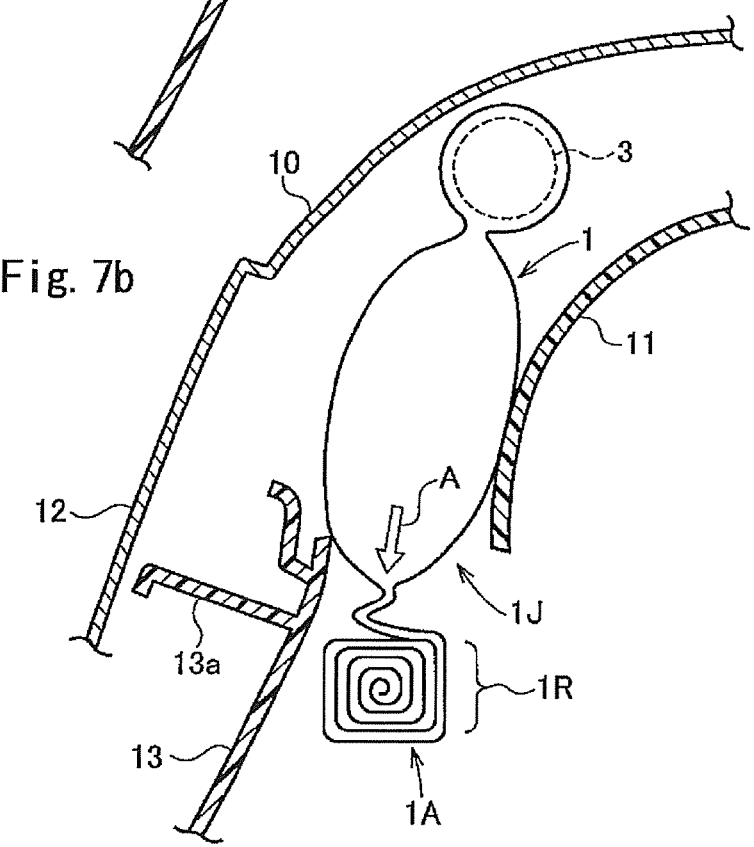

This will be described in detail below with reference to FIGS. 7a and 7b. FIGS. 7a and 7b are sectional views of portions similar to those illustrated in FIGS. 4a and 4b, respectively. FIG. 7a illustrates a state before the curtain airbag 1 is inflated. FIG. 7b illustrates a state in which the curtain airbag 1 is inflated and upper portion of the main body 1A, which was pleat-folded, is deployed.

In the case where the lower portion of the curtain airbag main body 1A is roll-folded and the upper portion of the curtain airbag main body 1A is pleat-folded, the following portion of the main body 1A is preferably pleat-folded: a portion from the upper end to a portion which is positioned at the same level as or slightly lower than the upper end of the B-pillar garnish 13 when the curtain airbag 1 has been completely inflated. That is, the length of the upper portion of the main body 1A to be pleat-folded is preferably adjusted in accordance with the distance between the folded body of the curtain airbag 1 and the upper end of the B-pillar garnish 13.

For example, referring to FIG. 7a, the level of the B-pillar garnish 13 is lower than that illustrated in FIG. 4a, and a side edge portion of the roof side garnish 11 extends to a position lower than that in FIG. 4a so as to be engaged with the upper end of the B-pillar garnish 13. That is, in FIG. 7a, the distance between the folded body of the curtain airbag 1 and the upper end of the B-pillar garnish 13 is larger than that illustrated in FIG. 4a. In this case, the length of the portion of the main body 1A in the up-down direction to be pleat-folded is set to be larger than that in FIG. 4a by the length equal to or slightly larger than the difference between the level of the upper end of the B-pillar garnish 13 in FIG. 4a and the level of the upper end of the B-pillar garnish 13 in FIG. 7a.

When the curtain airbag 1 is inflated and a pleat-folded portion 1J (FIG. 7b) of the upper portion of the main body 1A is deployed, the pleat-folded portion 1J is deployed so as to extend in a single direction toward the lower end side. According to the present invention, the main body 1A is pressed toward the inside of the vehicle cabin by the inflated gas introduction portion 1b, and then the pleat-folded portion 1J of the main body 1A starts to be deployed. Thus, the pleat-folded portion 1J is deployed further toward the inside of the vehicle cabin than the upper end of the B-pillar garnish 13 as indicated by an arrow A in FIG. 7a. The length in the up-down direction of the pleat-folded portion 1J having been deployed is equal to or larger than the distance between the folded body of the curtain airbag 1 and the upper end of the B-pillar garnish 13. Accordingly, deployment of the pleat-folded portion 1J causes, as illustrated in FIG. 7b, a lower end of the pleat-folded the pleat-folded portion 1J and a roll-folded portion 1R) to reach a position at the same level as or lower than the upper end of the B-pillar garnish 13. The deployment continues until the roll-folded portion 1R is moved beyond the upper end of the B-pillar garnish 13 and sufficiently pressed into the vehicle cabin. By doing this, when the roll-folded portion 1R is deployed after the deployment of the pleat-folded portion 1J, the roll-folded portion 1R can be deployed while the roll-folded portion 1R does not slide on the B-pillar garnish 13 at all, or the period of time in which the roll-folded portion 1R is deployed while the roll-folded portion 1R slides on the B-pillar garnish 13 can be reduced. Thus, the time required for deployment of the entire curtain airbag 1 can be reduced, and the curtain airbag 1 can be deployed earlier.

When the length in the up-down direction of the pleat-folded portion 1J of the main body 1A having been deployed is shorter than the distance between the folded body of the curtain airbag 1 and the upper end of the B-pillar garnish 13, deployment of the pleat-folded portion 1J is completed and deployment of the roll-folded portion 1R is started before the roll-folded portion 1R is moved beyond the upper end of the B-pillar garnish 13 and sufficiently pressed into the vehicle cabin. Thus, the roll-folded portion 1R is deployed in the vehicle cabin while sliding on the B-pillar garnish 13. This may delay deployment of the roll-folded portion 1R due to frictional resistance produced between the roll-folded portion 1R and the B-pillar garnish 13. As a result, the time required for deployment of the entire curtain airbag 1 may be increased, and accordingly, deployment of the curtain airbag 1 may be delayed.

Although the gas introduction portion 1b is disposed above the B-pillar in the above-described embodiment, the position of the gas introduction portion 1b is not limited to this.

Figure 8A:
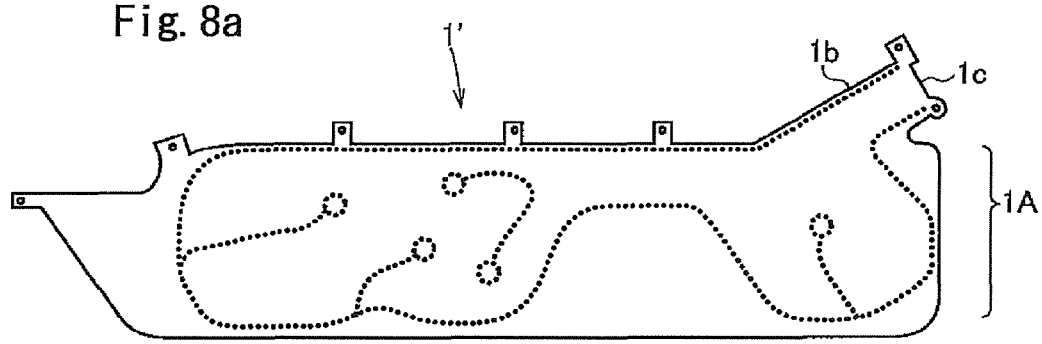
FIGS. 8a-8b are side views of modifications of the curtain airbag.
Figure 8B:
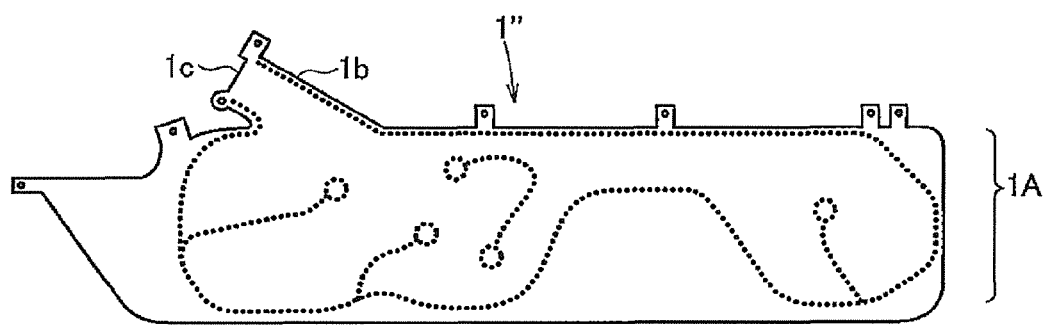

Although only one gas introduction portion 1b is continuous with the curtain airbag main body 1A in the above-described embodiment, the number of gas introduction portions 1b is not limited to this. For example, the gas introduction portion 1b may be disposed above the C-pillar as is the case with a curtain airbag 1' illustrated in FIG. 8a. The gas introduction portion 1b may alternatively be disposed above the A-pillar as is the case with a curtain airbag 1" illustrated in FIG. 8b. Referring to FIG. 8b, the gas introduction portion 1b forwardly extends in a diagonally upward direction from an upper edge portion of the curtain airbag main body 1A. In contrast, the gas introduction portion 1b may rearwardly extend in a diagonally upward direction from the upper edge portion of the curtain airbag main body 1A. In the case where the gas introduction portion 1b is disposed above a pillar other than the A-pillar such as the B-pillar or the C-pillar, the gas introduction portion 1b may forwardly extend in a diagonally upward direction from the upper edge of the main body 1A. As is the case with a curtain airbag 1''' illustrated in FIG. 8c, the gas introduction portions 1b may be provided above a plurality of the pillars such as the B-pillar and C-pillar. Other structures of the above-described curtain airbags 1', 1", and 1''' are similar to those of the curtain airbag 1 illustrated in FIGS. 1a, 1b, and 1c, and, in FIGS. 8a, 8b, and 8c, the same reference signs as those in FIGS. 1a, 1b, and 1c denote the same elements. Although illustration is omitted, the gas introduction portions 1b may be disposed above the A-pillar and another pillar. The gas introduction portions 1b may be provided above three or more pillars. The gas introduction portion 1b may be provided above a pillar other than the above-described pillars in accordance with the structure of the vehicle body.

Figure 9:
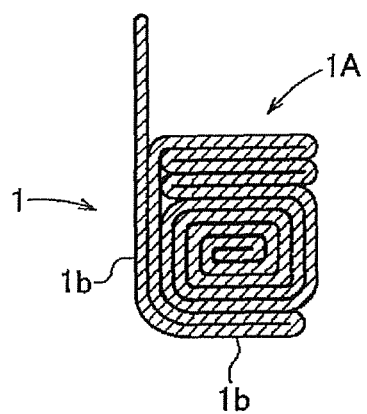
FIG. 9 is a sectional view illustrating an alternative method of folding the curtain airbag.

In the above-described embodiment, the gas introduction portion 1b is folded so as to be disposed only on the side surface on the vehicle body member side of the folded body of the curtain airbag main body 1A. However, this does not limit arrangement of the gas introduction portion 1b when the curtain airbag 1 has been folded. For example, as illustrated in FIG. 9, the gas introduction portion 1b may be folded so as to be disposed not only on the side surface on the vehicle body member side of the folded body of the main body 1A but also on a lower surface of the folded body of the main body 1A. FIG. 9 is a sectional view illustrating part of the curtain airbag 1, the part being similar to that illustrated in FIG. 2a. In FIG. 9, the main body 1A is folded into an elongated folded body, and then the gas introduction portion 1b is bent downward from the upper edge of the side surface on the vehicle body member side of the folded body along the side surface on the vehicle body member side. Then, the gas introduction portion 1b is directed from the side surface to the lower side of the folded body so as to be disposed on the lower surface of the folded body. Then, the gas introduction portion 1b is folded toward the vehicle member side near an end edge of the lower surface of the folded body, the end edge being located on the interior side, so as to face again the lower surface of the folded body, and then is directed along the side surface of the folded body on the vehicle body member side so as extend upward without being bent. By folding the gas introduction portion 1b so as to be disposed on an area from the side surface on the vehicle body member side to the lower surface of the folded body of the main body 1A as described above, during inflation of the curtain airbag 1, when the gas introduction portion 1b is inflated by the gas introduced thereto from the inflator 3, the inflated gas introduction portion 1b presses the folded body of the main body 1A toward the inside of the vehicle cabin with a larger force. In FIG. 9, the gas introduction portion 1b is folded into two layers continuously from the side surface on the vehicle body member side to the lower surface of the folded body of the main body 1A. Alternatively, the gas introduction portion 1b may be folded into four or more even number of layers such as four layers or six layers. Although illustration is omitted, the gas introduction portion 1b may be bent so as to be disposed also on, for example, an upper surface side of the folded body of the main body 1A.

Figure 10:
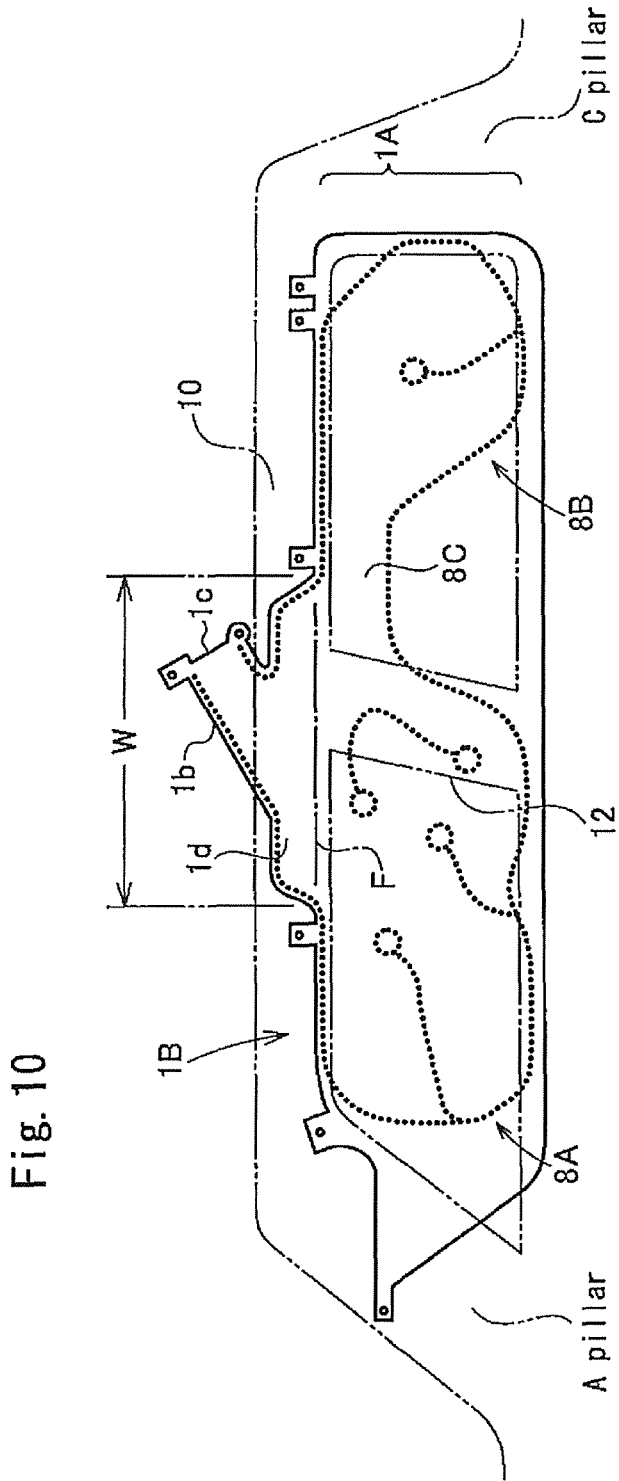
FIG. 10 is a side view of a curtain airbag according to an alternative embodiment.

FIG. 10 is a side view of a curtain airbag 1B according to an alternative embodiment having been inflated and developed.

As is the case with the above-described curtain airbag 1 illustrated in FIGS. 1a, 1b, and 1c, the gas introduction portion 1b of the curtain airbag 1B is disposed above the B-pillar 12. In this embodiment, as illustrated in FIG. 10, a large width portion 1d is formed on a base end (lower end) side of the gas introduction portion 1b. A width W of the large width portion 1d in the front-rear direction (front-rear direction of the vehicle hereafter) is larger than the width of the gas introduction portion 1b on a tip end (upper end) side. A whole width of a lower end side of the large width portion 1d in the front-rear direction communicate with an intermediate portion in the front-rear direction of the gas introduction path 8C on the upper edge of the curtain airbag main body 1A.

The width W in the front-rear direction of the large width portion 1d is larger than the width in the front-rear direction of the upper end portion of the B-pillar garnish 13 (not shown) attached to the B-pillar 12. The width W in the front-rear direction of the large width portion 1d is preferably set to be about 1.0 to 3.0 times, about 1.5 times to 2.5 times in particular, the width in the front-rear direction of the upper end portion of the B-pillar garnish 13. In a state in which the curtain airbag 1B is installed in the vehicle, a front end side of the large width portion 1d preferably projects further forward than a front edge of the upper end portion of the B-pillar garnish 13 by about 0 to 150 mm, about 20 to 100 mm in particular, and a rear end side of the large width portion 1d preferably projects further rearward than a rear edge of the upper end of the B-pillar garnish 13 by about 0 to 150 mm, about 20 to 100 mm in particular. The width in the up-down direction of the large width portion 1d is preferably set to be about 20 to 70%, about 30 to 50% in particular, of the length L (see FIG. 5) in the up-down direction of the whole gas introduction portion 1b.

Other structures of the above-described curtain airbag 1B are similar to those of the curtain airbag 1 illustrated in FIGS. 1a, 1b, and 1c, and, in FIG. 10, the same reference signs as those in the FIGS. 1a, 1b, and is denote the same elements.

Also in the present embodiment, the curtain airbag main body 1A of the curtain airbag 1B is folded into a folded body elongated in the front-rear direction, and then the gas introduction portion 1b is folded so as to be disposed on the surface on the exterior side of the curtain airbag main body 1A and bound with the binders 2. In so doing, the gas introduction portion 1b is bent back toward the exterior from the lower end of the large width portion 1d along a folding line F (FIG. 10), which extends in the front-rear direction at the same level as the upper edge of the curtain airbag main body 1A. By doing this, the large width portion1d is disposed on the surface on the exterior side of the folded body of the curtain airbag main body 1A.

Methods of folding the curtain airbag 1B other than the method described above and the structure of the curtain airbag device including the folded body of the curtain airbag 1B are similar to those of the above-described embodiment.

Also in the curtain airbag device including the folded body of the above-described curtain airbag 1B, when the vehicle is involved in a collision or an overturn, the inflator 3 discharges the gas, which is supplied to the curtain airbag 1B so as to cause the curtain airbag 1B to start to be inflated. In this case, the gas from the inflator 3 initially flows into the gas introduction portion 1b so as to inflate the gas introduction portion 1b. Thus, the inflating force of the folded body of the curtain airbag main body 1A and the inflating pressure of the gas introduction portion 1b are superposed each other so as to press the lower edge of the roof side garnish 11 toward the inside of the vehicle cabin. Accordingly, the lower edge of the roof side garnish 11 is opened toward the inside of the vehicle cabin, and the curtain airbag 1B extends beyond the upper end portion of the B-pillar garnish 13 so as to be deployed in the vehicle cabin.

In so doing, on the base end side of the gas introduction portion 1b, the large width portion 1d is inflated larger in the front-rear direction than the upper end portion of the B-pillar garnish 13. Thus, not only a portion of the folded body of the curtain airbag main body 1A, the portion being located immediately above the B-pillar garnish 13, but also portions of the folded body of the curtain airbag main body 1A, the portions being located on the front side and rear side with respect to the B-pillar garnish 13, are pressed toward the interior by the inflated large width portion 1d. Accordingly, the portion of the folded body of the curtain airbag main body 1A, the portion located above the B-pillar garnish 13, is moved toward the interior with allowances on the front and rear sides, thereby allowing the folded body of the curtain airbag main body 1A to be more reliably moved beyond the upper end portion of the B-pillar garnish 13 so as to be deployed in the vehicle cabin.

With the large width portion 1d formed in the gas introduction portion 1b, adjustment with which the folded body of the curtain airbag main body 1A is, when the gas introduction portion 1b is inflated, pressed toward the interior with a larger force can be performed.

Furthermore, with the large width portion 1d formed in the gas introduction portion 1b, errors in attachment of the folded body of the curtain airbag 1B to the vehicle can be addressed. That is, when the folded body of the curtain airbag 1B is attached to the vehicle, the large width portion 1d can be disposed between the folded body of the curtain airbag main body 1A and the vehicle body member at a position above the B-pillar 12 even with slight misalignment in the front-rear direction of the attaching position of the folded body. Thus, even when there is a slight error in the attaching position of the folded body of the curtain airbag 1B, when the curtain airbag 1B is inflated, the inflated gas introduction portion 1b (large width portion 1d) can reliably press the folded body of the curtain airbag main body 1A toward the interior. As a result, required attachment precision with which the folded body of the curtain airbag 1B is attached to the vehicle can be relaxed.

Figure 8C:
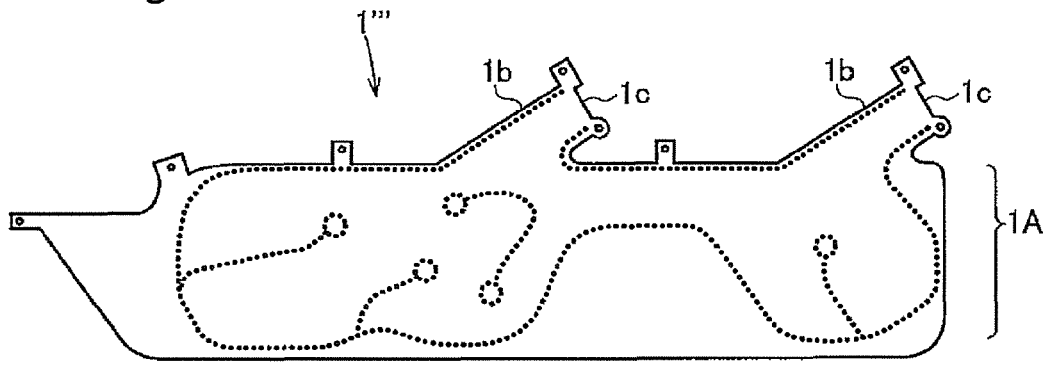

In the present embodiment, an example is described, in which the large width portion 1d is formed on the base end side of the gas introduction portion 1b disposed above the B-pillar 12. However, the large width portion 1d may be formed in the gas introduction portion 1b also in the case where the gas introduction portions 1b are disposed above other pillars as illustrated in FIGS. 8a, 8b, and 8c.

Although the large width portion 1d is formed on the base end side of the gas introduction portion 1b in the present embodiment, the position of the large width portion 1d is not limited to this. For example, the large width portion 1d may instead be formed in an intermediate portion in the up-down direction of the gas introduction portion 1b.

Although the inflator is directly connected to the gas introduction portion in the above-described embodiment, the inflator and the gas introduction portion may be connected through a duct.

Although the present invention has been described in detail using specific embodiments, it will be appreciated by those skilled in the art that a variety of changes are possible without departing from the gist and the scope of the present invention.

The invention claimed is:

1. A curtain airbag device comprising:
a curtain airbag for being deployed in an interior of a vehicle cabin;
a folded body of the curtain airbag disposed in a space between a vehicle body member and a side edge portion of a roof lining; and
an inflator that inflates the curtain airbag,
wherein the curtain airbag includes:
a gas introduction portion positioned at a level above an upper end of a pillar garnish, the gas introduction portion extending upward from a curtain airbag main body, a gas being introduced from the inflator to the curtain airbag main body through the gas introduction portion, and
an upper, pleat-folded portion and a lower, roll-folded portion of the curtain airbag main body in the folded body of the curtain airbag with the pleat-folded portion being sized so that upon airbag deployment, the upper, pleat-folded portion inflates to advance the lower, roll-folded portion down beyond the upper end of the pillar garnish prior to inflation thereof,
wherein, in a state in which the curtain airbag is folded into the folded body thereof, the gas introduction portion is disposed on a side surface of the folded curtain airbag main body, the side surface being located to face the vehicle body member with the gas introduction portion being folded into a predetermined number of layers that extend along the side surface of the folded curtain airbag main body including both the upper, pleat-folded portion and the lower, roll-folded portion thereof, the predetermined number of layers of the gas introduction portion being selected to control pushing of the folded curtain airbag main body inwardly into the vehicle cabin interior by inflation of the gas introduction portion prior to inflation of the upper, pleat-folded portion and the lower, roll-folded portion of the curtain airbag main body.

2. The curtain airbag device according to claim 1, wherein the gas introduction portion is bent at a lower portion of the side surface of the folded body of the curtain airbag main body so as to be folded into at least two layers and disposed along the side surface of the curtain airbag main body.

3. The curtain airbag device according to claim 1, wherein the folded body of the curtain airbag main body and the gas introduction portion are bound together with a binder.

4. The curtain airbag device according to claim 1, wherein in roll-folding the lower, roll-folded portion of the curtain airbag main body, the curtain airbag main body is roll-folded from a lower end thereof to a boundary between the lower, roll-folded portion and the upper, pleat-folded portion with a surface of the curtain airbag main body located near the center of a roll, the surface of the curtain airbag main body facing a side surface of a vehicle cabin when deployment of the curtain airbag main body is completed.

5. The curtain airbag device according to claim 1, wherein a large width portion is formed on a base end side of the gas introduction portion, a width of the large width portion in a vehicle front-rear direction being larger than a width in the vehicle front-rear direction on a tip end side of the gas portion, wherein the base end of the gas introduction portion communicates with an intermediate portion in the vehicle front-rear direction of an upper portion of the large width portion, and wherein a whole width in the vehicle front-rear direction of a lower portion of the large width portion communicates with an upper portion of the curtain airbag main body.

6. A vehicle comprising:

folded body of the curtain airbag of the curtain airbag device according to claim 1 disposed in a space between a vehicle body member and a side edge portion of a roof lining; and the gas introduction portion disposed above a pillar garnish.

7. The curtain airbag device according to claim 1, wherein a large width portion is formed between a base end of the gas introduction portion and the upper edge of the curtain airbag main body, and wherein a width of the large width portion is larger than a width of the base end of the gas introduction portion in a vehicle front-rear direction, and the width of the large width portion is smaller than a width of the upper edge of the curtain airbag main body in the vehicle front-rear direction.

8. The curtain airbag device according to claim 1, wherein a large width portion is formed between a base end of the gas introduction portion and the upper edge of the curtain airbag main body; and wherein a width of the large width portion is larger than a width of the upper end of the pillar garnish in a vehicle front-rear direction.

* * * * *